(12) United States Patent
Soshin

(10) Patent No.: US 8,943,042 B2
(45) Date of Patent: Jan. 27, 2015

(54) ANALYZING AND REPRESENTING INTERPERSONAL RELATIONS

(75) Inventor: Alexey Soshin, Ramat Gan (IL)

(73) Assignee: SAP Portals Israel Ltd, Raanana (IL)

(*) Notice: Subject to any disclaimer, the term of this patent is extended or adjusted under 35 U.S.C. 154(b) by 133 days.

(21) Appl. No.: 13/331,703

(22) Filed: Dec. 20, 2011

(65) Prior Publication Data

US 2013/0159280 A1 Jun. 20, 2013

(51) Int. Cl.
*G06F 17/30* (2006.01)

(52) U.S. Cl.
USPC .......................................... 707/714

(58) Field of Classification Search
USPC .................... 707/714, 718, 771, 999.101
See application file for complete search history.

(56) References Cited

U.S. PATENT DOCUMENTS

| | | | | |
|---|---|---|---|---|
| 5,701,460 | A * | 12/1997 | Kaplan et al. ................ | 707/748 |
| 7,016,910 | B2 * | 3/2006 | Egilsson et al. .................... | 1/1 |
| 7,979,384 | B2 * | 7/2011 | Bozkaya et al. .............. | 707/602 |
| 2002/0178161 | A1 * | 11/2002 | Brezin et al. .................. | 707/10 |
| 2003/0187813 | A1 * | 10/2003 | Goldman et al. ................. | 707/1 |
| 2005/0075917 | A1 * | 4/2005 | Flores et al. ..................... | 705/8 |
| 2006/0080287 | A1 * | 4/2006 | Majd et al. ...................... | 707/3 |
| 2008/0033914 | A1 * | 2/2008 | Cherniack et al. .............. | 707/3 |
| 2008/0140614 | A1 * | 6/2008 | Nouri et al. ..................... | 707/2 |
| 2009/0228830 | A1 * | 9/2009 | Herz et al. ................... | 715/808 |
| 2011/0022581 | A1 * | 1/2011 | Korlapati ..................... | 707/713 |
| 2011/0097694 | A1 * | 4/2011 | Yeh et al. ..................... | 434/237 |
| 2011/0182485 | A1 * | 7/2011 | Shochat et al. ............... | 382/118 |
| 2012/0066239 | A1 * | 3/2012 | Childers et al. .............. | 707/758 |

OTHER PUBLICATIONS

'MySQL Enterprise Edition Product Guide' [online]. Oracle, 2011, [retrieved on Dec. 19, 2011]. Retrieved from the Internet: <URL: http://www.oracle.com/us/products/mysql/mysql-ee-prod-guide-487992.pdf>, 24 pages.

'Join (SQL)' [online] Wikipedia, Dec. 2010, [retrieved on Dec. 19, 2011]. Retrieved from the Internet: <URL: http://en.wikipedia.org/w/index.php?title=Join_(SQL)&oldid=404855742>, 9 pages.

'Breadth first search' [online]. Wikipedia, Dec. 2010, [retrieved on Dec. 19, 2011]. Retrieved from the Internet: <URL: http://en.wikipedia.org/w/index.php?title=Breadth-first_search&oldid=403038937>, 3 pages.

'Oracle Database' [online]. Wikipedia, Dec. 2010, [retrieved on Dec. 19, 2011]. Retrieved from the Internet: <URL: http://en.wikipedia.org/w/index.php?title=Oracle_Database&oldid=403700553>, 17 pages.

(Continued)

*Primary Examiner* — Mohammed R Uddin
(74) *Attorney, Agent, or Firm* — Fish & Richardson P.C.

(57) ABSTRACT

A computer-implemented method for analyzing and representing interpersonal relations includes: receiving, in a computer system, a user input requesting a representation of interpersonal relations regarding a person; executing, based on the user input and in a relational database, a relational-database query that selects relations involving the person, and that selects other persons involved in any of the selected relations, wherein the relational-database query is performed for each of the selected other persons until a maximum number of steps; and providing the representation of interpersonal relations in response to the user input, the representation indicating at least persons selected by the relational-database query.

18 Claims, 5 Drawing Sheets

(56) References Cited

OTHER PUBLICATIONS

'A* search algorithm' [online] Wikipedia, Dec. 2010, [retrieved on Dec. 19, 2011]. Retrieved from the Internet: <URL: http://en.wikipedia.org/w/index.php?title=Oracle_Database&oldid=403700553>, 5 pages.

'H4T—HANA for Triples' [online]. SAP, Jul. 2011, [retrieved on Dec. 20, 2011]. Retrieved from the Internet: <URL: https://cw.sdn.sap.com/cw/ideas/4721>, 2 pages.

'SocialPulse—What we know and how we share it' [online]. SAP, Jul. 2011, [retrieved on Dec. 19, 2011]. Retrieved from the Internet: <URL: https://cw.sdn.sap.com/cw/ideas/4879>, 4 pages.

'New innovations in SAP Streamwork Support Vision for on Premise, on Demand and on Device, Bringing More Choices to Business and it' [online]. SAP, Dec. 2010, [retrieved on Dec. 19, 2011]. Retrieved from the Internet: <URL: http://www.sap.com/press.epx?pressid=14474>, 2 pages.

'Hana and BW 7.30—Part 1' [online]. SAP, Jun. 2011, [retrieved on Dec. 19, 201]. Retrieved from the Internet: <URL: http://www.sdn.sap.com/irj/scn/weblogs?blog=/pub/w1g/25122>, 6 pages.

'Hana and BW 7.30—Part 2' [online]. SAP, Jun. 2011, [retrieved on Dec. 19, 201]. Retrieved from the Internet: <URL: http://www.sdn.sap.com/irj/scn/weblogs?blog=/pub/w1g/25123>, 5 pages.

'JSON' [online]. Wikipedia, Dec. 2010, [retrieved on Dec. 19, 2011]. Retrieved from the Internet: <URL: http://en.wikipedia.org/w/index.php?title=JSON&oldid=403963724>, 14 pages.

'Relational database' [online]. Wikipedia, Dec. 2010, [retrieved on Dec. 19, 2011]. Retrieved from the Internet: <URL: http://en.wikipedia.org/w/index.php?title=Relational_database&oldid=405154741>, 5 pages.

Extended European Search Report dated Apr. 26, 2013 for application No. EP12008421.5, 6 pages.

Elmasri et al., "Fundamentals of Database Systems Fourth Edition", Fundamentals of Database Systems, XX, XX, No. Ed. 4, Sep. 1, 2004, 113 pages.

* cited by examiner

```
Input : max_steps integer
declare
    -- step index
    i integer := 0;
    -- object index
    oi integer := 0;
    -- Back object index
    bi integer := 0;
begin
    PRINT 'select * from (select';
    loop
        PRINT 'e%.display_name,', i;
        i := i+1;
        if (i > max_steps) then
            exit;
        end if;
    end loop;
    PRINT 'from entities e0 join relations r0 on (e0.id in (r0.source, r0.target)';    ~ 202
    i := 1;
    loop
        -- Join relations
        if (mod(i, 2) = 0) then
            oi := (i / 2);
            PRINT 'left join relations r% on (e%.id in (r%.source, r%.target) and    ~ 204
r%.type_id in ("%"))', oi, oi,oi,oi,'reportsTo';
            -- Join entities
```

FIG. 2A

```
        else
            oi := (i / 2) + 1;
            PRINT 'left join entities e% on (e%.id in (r%.source, r%.target) and e%.id
not in (', oi, oi, oi - 1, oi - 1, oi;
            bi := oi;
            -- Exclude all occurrences of previously iterated IDs
            loop
                bi := bi - 1;
                if (bi < 0) then
                    exit;
                end if;
                PRINT 'e%.id', bi;
                if (bi > 0) then
                    PRINT ',';
                end if;
            end loop;
            PRINT '))';
        end if;
        i := i+1;
        if (i > max_steps * 2 - 1) then
            exit;
        end if;
    end loop;
    PRINT ') a';
    return true;
end;
```

200 ⟶ (annotations: 206, 208 — "-- Exclude all occurrences of previously iterated IDs")

FIG. 2B

```
select *
from (
select e0.display_name, e1.display_name, e2.display_name
from entities e0
join relations r0 on (e0.id in (r0.source, r0.target) and r0.type_id in ('reportsTo'))  ~302
join entities e1 on (e1.id in (r0.source, r0.target) and e1.id not in (e0.id))  ~304
left join relations r1 on (e1.id in (r1.source, r1.target) and r1.type_id in ('reportsTo'))  ~306
left join entities e2 on (e2.id in (r1.source, r1.target) and e2.id not in (e1.id, e0.id))  ~308
where e0.display_name ='Alexey Soshin'
order by e1.display_name, e2.display_name) a
```

FIG. 3

```
select *
from (
select e0.display_name, e1.display_name, e2.display_name
from entities e0
join relations r0 on (e0.id in (r0.source, r0.target))  ~404
join entities e1 on (e1.id in (r0.source, r0.target) and e1.id not in (e0.id))
left join relations r1 on (e1.id in (r1.source, r1.target))  ~406
left join entities e2 on (e2.id in (r1.source, r1.target) and e2.id not in (e1.id, e0.id))
where e0.display_name ='Alexey Soshin'
and 'Meni Tito' in (e1.display_name, e2.display_name)  ~402
order by e1.display_name, e2.display_name) a
```

FIG. 4

ANALYZING AND REPRESENTING INTERPERSONAL RELATIONS

TECHNICAL FIELD

This document relates to analyzing and representing interpersonal relations.

BACKGROUND

Many computer systems store information that represents entities, both abstract and real ones. Some organizations operate an enterprise business system in a computer network to manage information about production, transactions, business partners and personnel, to name just a few examples. For example, the system can have stored therein database objects that correspond to and represent products, sales documents, customers or employees, as well as the relationships between any such entities. Database information is then updated with current information as needed.

However, the database of entities does not give an overview of any interpersonal relationships that may exist. Nor do such entities indicate the degree of separation between any two entities, for example whether they have relations to the same person. Moreover, some algorithms require as many queries as there are nodes in the graph of the relationships.

SUMMARY

In a first aspect, a computer-implemented method for analyzing and representing interpersonal relations includes: receiving, in a computer system, a user input requesting a representation of interpersonal relations regarding a person; executing, based on the user input and in a relational database, a relational-database query that selects relations involving the person, and that selects other persons involved in any of the selected relations, wherein the relational-database query is performed for each of the selected other persons until a maximum number of steps; and providing the representation of interpersonal relations in response to the user input, the representation indicating at least persons selected by the relational-database query.

In a second aspect, a computer program product is tangibly embodied in a computer-readable storage medium and includes instructions that when executed by a processor perform a method for analyzing and representing interpersonal relations. The method includes: receiving, in a computer system, a user input requesting a representation of interpersonal relations regarding a person; executing, based on the user input and in a relational database, a relational-database query that selects relations involving the person, and that selects other persons involved in any of the selected relations, wherein the relational-database query is performed for each of the selected other persons until a maximum number of steps; and providing the representation of interpersonal relations in response to the user input, the representation indicating at least persons selected by the relational-database query.

In a third aspect, a system includes: one or more processors; and a computer program product tangibly embodied in a computer-readable storage medium and comprising instructions that when executed by a processor perform a method for analyzing and representing interpersonal relations. The method includes: receiving, in a computer system, a user input requesting a representation of interpersonal relations regarding a person; executing, based on the user input and in a relational database, a relational-database query that selects relations involving the person, and that selects other persons involved in any of the selected relations, wherein the relational-database query is performed for each of the selected other persons until a maximum number of steps; and providing the representation of interpersonal relations in response to the user input, the representation indicating at least persons selected by the relational-database query.

Implementations can include any or all of the following features. The relational-database query includes: a first join of any relations that specify the person in at least one column; a second join of any persons who are specified in the relations of the first join; at least a first left join of relations that specify any of the persons of the second join; and at least a second left join of any persons who are specified in the relations of the first left join; wherein the relational-database query continues to perform left joins until the maximum number of steps is reached.

The relational-database query is executed on a relational database that includes a relations table, wherein for each relation the relations table includes a first column for a source of the relation and a second source for a target of the relation, and wherein the relational-database query selects the relation if the first column indicates the person and also if the second column indicates the person.

The user input identifies another person and seeks those of the interpersonal relations regarding the person that involve the identified other person.

The relational-database query is executed in an on-demand system to which a user uploads information about persons and connections, and after receiving the user input the on-demand system provides the representation of interpersonal relations to the user.

The user input specifies the maximum number of steps.

The method further includes generating a social graph as the representation of interpersonal relations.

Implementations can provide any or all of the following advantages. Organizational data can be analyzed, for example so as to calculate weights or prioritization. A single algorithm can be executed, for example to identify clusters that are then used in the analysis. One or more paths for a social network graph can be calculated. Iterations over relationships in a social network can be done faster or more efficiently. All available relationships at an arbitrary degree of separation from a person can be determined and presented.

The details of one or more implementations are set forth in the accompanying drawings and the description below. Other features and advantages will be apparent from the description and drawings, and from the claims.

DESCRIPTION OF DRAWINGS

FIGS. 2A-B show an example of pseudocode for analyzing and representing interpersonal relations.

FIG. 3 shows an example algorithm for analyzing and representing interpersonal relations.

FIG. 4 shows another example algorithm for analyzing and representing interpersonal relations.

Like reference symbols in the various drawings indicate like elements.

DETAILED DESCRIPTION

This disclosure describes examples of analyzing and representing interpersonal relations. In some implementations, an algorithm for analyzing relations is implemented as a database query formulated in a basic query language for a relational database. With interpersonal relations it can almost always be assumed that the number of connections for any arbitrary node is limited, and that analyzing the database by executing a suitable query is therefore a manageable task. That is, even if an entity (e.g., an employee) has thousands of registered relations or more, a query engine can quickly go through the relations in the database and extend the search in one or more steps.

In some implementations, based on a specified starting entity (e.g., a specific employee) and the maximum numbers of separation steps that are of interest, the algorithm can find in the database and present all entities having relations to the starting entity of at most the maximum number of steps. As another example, based on two specified entities, the algorithm can find all relation paths that connect the two entities, optionally with at most the maximum number of steps.

Figure 1:
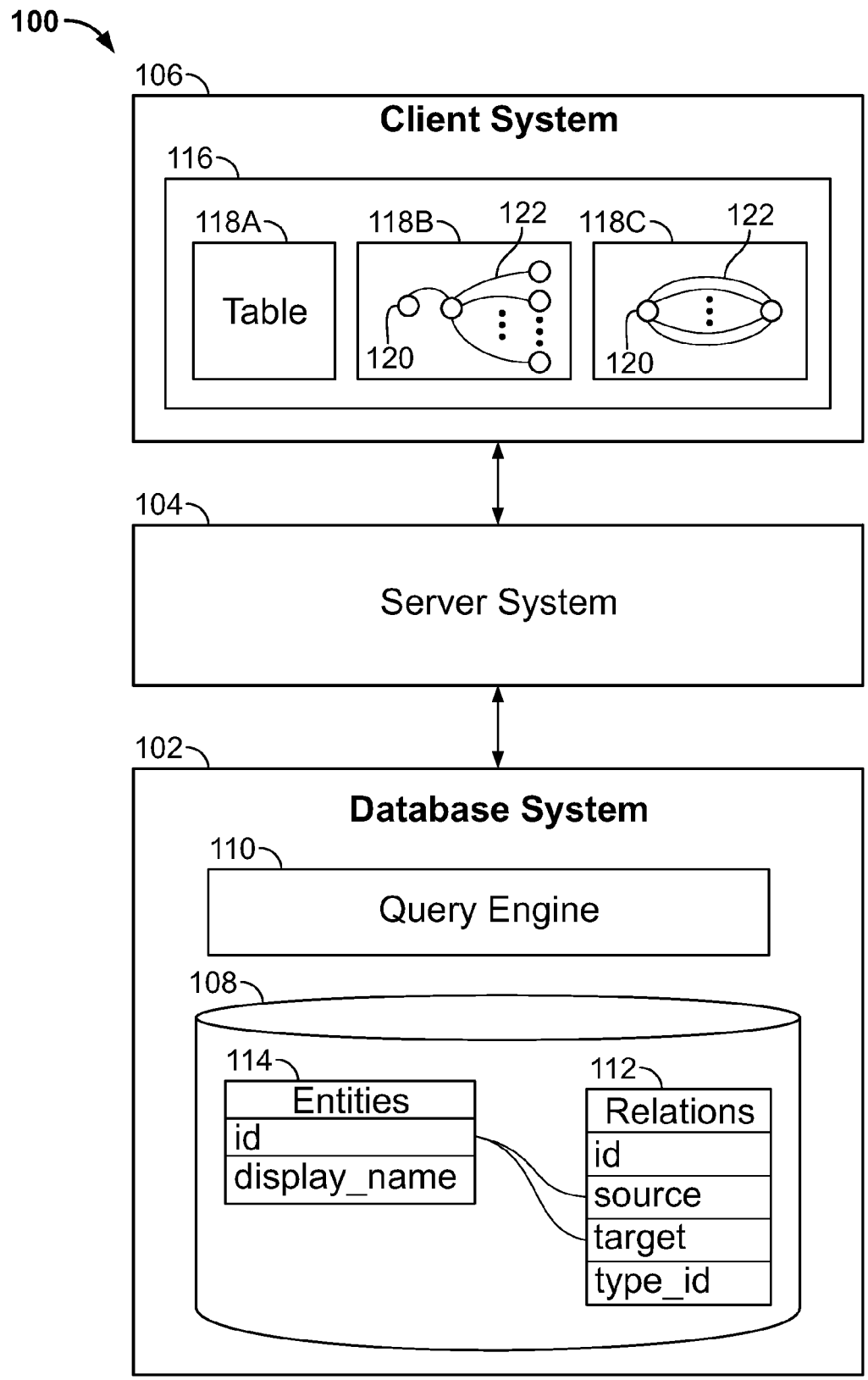
FIG. 1 shows an example architecture for analyzing and representing interpersonal relations.

FIG. 1 shows an example architecture 100 for analyzing and representing interpersonal relations. The architecture 100 includes at least one of each of: a database system 102, a server system 104 and a client system 106. One or more of the systems 102-106 can be distributed over more than one physical device. In some implementations, two or more of the systems 102-106 can be installed on the same device. The systems can communicate with each other and/or with other components (not shown) using any suitable connection, protocol or form of transmission. For example, the server system 104 and the client system 106 can be connected through one or more networks, such as the internet. The client system 106 can include a browser and/or at least one specially configured program capable of interfacing with the server system 104 and/or directly with the database system 102. In some implementations, other structures can be used, including those that do not involve a client-server architecture.

The database system 102 includes at least one relational database 108 and at least one query engine 110. For example, the database system 108 is considered part of a backend system. The query engine is configured to run queries on the database 108 using any suitable query language including, but not limited to, SQL. Such queries can be stored in the query engine ahead of time and executed upon command, or the query can be provided to the query engine in real time for execution, to name just two examples. Any suitable relational database can be used.

Here, the relational database 108 includes a number of tables. A relations table 112 is here shown to include at least four keys (id, source, target and type_id), for a relation ID, a source entity, a target entity and a type of relation, respectively. For example, an entry in the relation table can be represented as:

| id | source | target | type_id |
|---|---|---|---|
| ABC123XYZ | Person1 | Person2 | reportsTo |

Namely, the above entry specifies that the relation called ABC123XYZ connects Person1 as reporting to Person2 in the organization that uses the database in this example. The terms Person1 and Person2 can be identifiers or names for respective employees, to name just two examples. Other relations can be used instead of, or in addition to, the one above. The relations table 112 will include one entry for each defined relation. In some implementations, one or more other columns can be included in the relations table. For example, the validity period for the relationship can be specified using one or more dates or times.

The relational database 108 includes an entities table 114 that has at least two keys (id and display_name) for an entity ID and the display name of that entity, respectively. For example, an entry in the relation table can be represented as:

| id | display_name |
|---|---|
| Person2 | Alexey Soshin |

Namely, the above entry specifies that the entity called Person2 should be displayed as "Alexey Soshin". In some implementations, the entities table 114 includes more columns to specify more information regarding each entity, for example the person's profile and/or a photograph of the person.

The server system 104 provides one or more services and makes them accessible to users. In some implementations, applications are implemented as programs executed in the server system. For example, one or more enterprise resource planning (ERP) programs can be operated to manage some aspect(s) of an organization's activities.

The client system 106 is used by one or more individual users to access the server system 104 and/or the database system 102. The user can retrieve information from the system(s), store new information therein, and/or manipulate existing information, to name just a few examples. In some implementations, the client system 106 is implemented using one or more personal computers, handheld computers, smartphones or any other suitable type of device. A user generates an input using the client system 106, which input requests a representation of interpersonal relations regarding a person to be shown, and this input is ultimately received in the database system 102. The input can identify the starting entity and can specify the maximum number of steps, for example.

The client system 106 can present results of relations analyses in one or more ways using a graphical user interface (GUI) 116. That is, the database system 102 can provide the representation of interpersonal relations first to the server system 104, which in turn can generate a corresponding transmission to the client system. In some implementations, the client system 106 uses a default GUI of one or more applications executed in the server system 104. For example, a default GUI provided for some enterprise applications from SAP AG can be used. In some implementations, a designated GUI is written to interface with the database system 102 and particularly to initiate a database query that executes an algorithm for analyzing interpersonal relations. Such designated GUI can receive information from the database system 102 in any suitable format. For example, information can be provided using XML code and/or according to JavaScript Object Notation (known as JSON).

In some implementations, the GUI 116 presents results in tabular form. A table 118A can then be displayed that shows names or other identifiers of persons that have been found in the analysis.

For example, assume that a user is interested in persons that are indirectly connected to "Alexey Soshin" through a "reportsTo" relation. Particularly, the user is only interested in those separated from Alexey Soshin by exactly two steps, and not, say, those that are separated by three or more steps and therefore potentially less acquainted with Alexey Soshin. Limiting the inquiry to a maximum number of separation steps can also avoid too many results. After the database query is performed on the relational database 102, the table 118A can include information as shown in the following partial excerpt:

| Step | display_name | display_name | display_name |
|---|---|---|---|
| . | | | |
| . | | | |
| . | | | |
| 8 | Alexey Soshin | Ohad Yassin | Eli Frumerman |
| 9 | Alexey Soshin | Ohad Yassin | Idan Bidani |
| 10 | Alexey Soshin | Ohad Yassin | Inbal Sabag |
| . | | | |
| . | | | |
| . | | | |

That is, the table 118A here shows the result as a list of steps, where each step represents a relationship between Alexey Soshin and another person. The first column of names here lists Alexey Soshin for every step, because this starting entity is common to the entire query. In some implementations, this information is not displayed, or is displayed in a different fashion than the other retrieved names.

The second column of names here lists the persons for whom a "reportsTo" relation was found that also specified Alexey Soshin. Particularly, if the query is broadly formulated this will include both those who report to Alexey Soshin, and the person(s) to whom Alexey Soshin reports. Otherwise, only one of these categories is included. Because the table above shows only an excerpt of the table 118A, the second column of names here shows the same name—"Ohad Yassin"—in each entry, but one or more other names can occur in the other entries.

The third column of names here lists the persons for whom a "reportsTo" relation was found that also specified the corresponding person in the second column. Similarly, this can broadly include both directions of reporting-to relations, or only one of them.

In some implementations, the GUI 116 presents one or more results in graphical form. For example, a social graph 118B and/or social graph 118C can be displayed. A social graph can show one or more nodes 120 corresponding to identified entities, and one or more edges 122 corresponding to identified relations. For example, one or more of the nodes 120 can present a picture or other illustration of the corresponding entity.

The social graph 118B shows part of a relationship analysis limited to two steps. That is, the leftmost node 120 can represent the starting entity (e.g., Alexey Soshin in the above example), the middle node(s) can represent the person(s) having a specified relation to the starting entity (e.g., a "reportsTo" relation), and the rightmost nodes can represent the identified relations of the person in the middle.

In an analogous way, the social graph 118C can represent some or all identified edges 122 that connect the nodes 120. In some implementations, each of the edges 122 in the social graph 118B represents a path from one entity to another. For example, the query is restricted so that only those of the edges 122 that involve at most two steps of separation are displayed.

The algorithm that is used in the database system 102 does not need any specific implementation. Rather, the algorithm is written in the basic database query language (e.g., SQL) of the relational database. This can provide important advantages. For example, if data is originally received in an Oracle database and some relations analysis is performed there, then the same algorithm can also or instead be used on a laptop computer having an SQL query program installed, and obtain the same result for the same data. That is, in this situation all the logic is processed by the database core, rather than, say, by specially coded logic in the server or elsewhere. For this reason, there is no need to implement the algorithm in a different language even though the analysis should be performed in a different context. Moreover, only a single query needs to be executed regardless of the number of nodes in the graph of relationships.

Relations analysis can be performed in an on-demand environment. In some implementations, the architecture 100 is used to provide on-demand services including, but not limited to, detection of social networks. For example, a user can employ the client system 106 to upload information about persons and connections between the persons. The database system 102 can then execute a relational-database query. The resulting representation of interpersonal relations can then be provided to the user, for example along the lines of the above examples.

Some or all of an algorithm can be performed using in-memory technology. For example, the relational database 108 already has stored the relations between entities and one or more intersections can be performed in the database. Thereby, only the result of joining the groups (in multiple iterations, sometimes) is delivered. Some implementations involve the In-Memory Computing Engine available from SAP AG, for example in an implementation that uses the High Performance Analytical Appliance, known as HANA, also from SAP AG.

FIGS. 2A-B show an example of pseudocode 200 for analyzing and representing interpersonal relations. At 202, the relations r0 of the starting object e0 are found. In this example, all directions of "reportsTo" relationships are included in the query. At 204, relations are left joined on the currently identified entities, whereas at 206 entities are left joined on the currently identified relations. That is, use of the pseudocode 202 requires the relational database to support the join operation.

At 208, all entities that the algorithm has already iterated over are excluded. For example, this can avoid problems when two entities have mutual relations to each other.

FIG. 3 shows an example algorithm 300 for analyzing and representing interpersonal relations. For example, the algorithm 300 corresponds to the situation when the pseudocode 200 (FIG. 2) has the parameter=2, meaning that two steps of separation between entities is sought. At 302, the starting entity's :reportsTo" relations are selected. At 304, the entities of the selected relations are selected. At 306, the relations of the selected entities are selected. At 308, the entities of the selected relations are selected. In this example, "Alexey Soshin" is the starting entity.

FIG. 4 shows another example algorithm 400 for analyzing and representing interpersonal relations. Some aspects of the algorithm 400 are analogous to those of the algorithm 300 (FIG. 3). However, at 402 the algorithm 400 specifies that "Meni Tito" must be the target entity for all identified relations. Accordingly, the algorithm 400 seeks to find paths between two specified entities, in this example the relations that have two steps of separation. Moreover, all types of relations are covered by this algorithm, not merely "reportsTo" relations. This is indicated at 404 and 406 by not specifying any type_id for the query.

Figure 5:
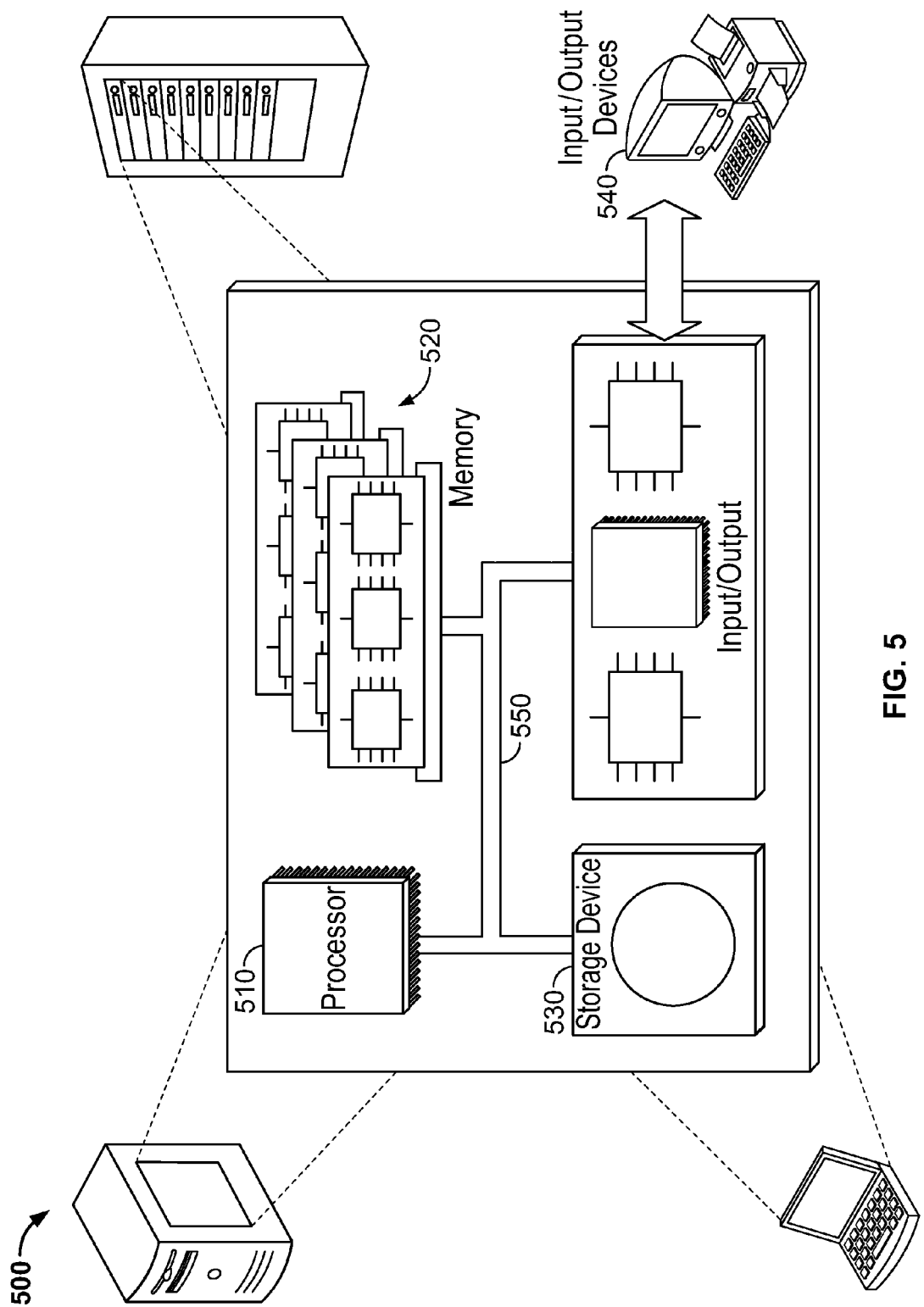
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540.

Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. The memory 520 is a volatile memory unit in some implementations and is a non-volatile memory unit in other implementations.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method comprising:
   receiving, by a computer server system and as having been sent from a client device, a request for information that specifies relationships of a first person, wherein the request includes:
   (i) information that identifies the first person, and
   (ii) information that indicates a user-specified number of relationship separations extending from the first person from which other persons are to be identified;
   automatically creating, by the computer server system and in response to receiving the request, a single database query that:
   (i) when executed, causes a database system to identify a particular group of persons in a relational database that are related to the first person due to the particular group of persons being within the user-specified number of relationship separations from the first person, and
   (ii) is structured to cause the database system to identify the particular group of persons by:
   (a) identifying a first group of persons in the relational database to include in the particular group of persons, the identifying of the first group of persons including an identification of persons who are directly related, through a single relationship type from among multiple relationship types, to the first person, and
   (b) identifying additional persons in the relational database to add to the particular group of persons by performing, for each relationship separation in the user-specified number of relationship separations that extend from the identified first group of persons, a database left join operation that joins a respective additional group of persons in the relational database who are directly related, through the single relationship type, to any person in a previously joined group of persons until the number of relationship separations extending from the first person, through the single relationship type, is determined to satisfy the user-specified number of relationship separations indicated in the request, wherein performing a first of the database left join operations comprises identifying a first additional group of multiple persons to add to the particular group of persons, wherein the first additional group of multiple persons are identified for addition to the particular group of persons based on the first additional group of multiple persons being directly related to the persons in the first group of persons and also being indirectly related to the first person;

providing, by the computer server system and to the database system in response to receiving the request, the single database query for execution by the database system, and in response, receiving results obtained by the database system from execution of the single database query, wherein the results specify the particular group of persons, wherein the database system is configured to execute the single database query in-memory;

generating, by the computer server system and based on the results obtained by the database system, the information that specifies the relationships of the first person; and providing, by the computer server system and to the client device in response to receiving the request, the information that specifies the relationships of the first person for display.

2. The computer-implemented method of claim 1, wherein the relational database includes:
   a first attribute for indicating a particular relationship type from among the multiple relationship types between a source person and a target person,
   a second attribute for indicating the identity of the source person, and
   a third attribute for indicating the identity of the target person,
   wherein the single database query is further structured to add each person in the first group of persons to the particular group of persons as a result of identifying database entries for each person for which the first attribute indicates the single relationship type, and for which one of the second attribute and the third attribute indicates the identity of the first person.

3. The computer-implemented method of claim 1, wherein the request further includes information that identifies a second person in the relational database, and wherein the single database query is further structured to identify only those persons in the relational database who are related to the first person through a relationship with the second person within the user-specified number of relationship separations.

4. The computer-implemented method of claim 1, wherein the single database query is executed in an on-demand system to which a user uploads information about persons and connections, and wherein after receiving the request from the client device, the on-demand system uses the uploaded information to generate the information that specifies the relationships of the first person.

5. The computer-implemented method of claim 1, wherein the request further includes information that specifies the single relationship type.

6. The computer-implemented method of claim 1, wherein the client device is configured to display the information provided by the computer server system that specifies the relationships of the first person as a social graph that comprises nodes and edges that represent (i) particular persons in the particular group of persons, and (ii) relations between the particular persons, respectively.

7. The computer-implemented method of claim 6, wherein the social graph comprises a first node that represents the first person, a second node that represents a second person, and a plurality of edges that connect the first node to the second node and that represent respective relationship paths, through the single relationship type, between the first person and the second person that are within the user-specified number of relationship separations, the social graph including only edges that represent respective relationship paths, through the single relationship type, between the first person and the second person that are within the user-specified number of relationship separations.

8. A computer program product tangibly embodied in a non-transitory computer-readable storage medium and comprising instructions that when executed by a processor perform a method for analyzing and representing interpersonal relations, the method comprising:
   receiving, by a computer server system and as having been sent from a client device, a request for information that specifies relationships of a first person, wherein the request includes:
      (i) information that identifies the first person, and
      (ii) information that indicates a user-specified number of relationship separations extending from the first person from which other persons are to be identified;
   automatically creating, by the computer server system and in response to receiving the request, a single database query that:
      (i) when executed, causes a database system to identify a particular group of persons in a relational database that are related to the first person due to the particular group of persons being within the user-specified number of relationship separations from the first person, and
      (ii) is structured to cause the database system to identify the particular group of persons by:
         (a) identifying a first group of persons in the relational database to include in the particular group of persons, the identifying of the first group of persons including an identification of persons who are directly related, through a single relationship type from among multiple relationship types, to the first person, and
         (b) identifying additional persons in the relational database to add to the particular group of persons by performing, for each relationship separation in the user-specified number of relationship separations that extend from the identified first group of persons, a database left join operation that joins a respective additional group of persons in the relational database who are directly related, through the single relationship type, to any person in a previously joined group of persons until the number of relationship separations extending from the first person, through the single relationship type, is determined to satisfy the user-specified number of relationship separations indicated in the request,
      wherein performing a first of the database left join operations comprises identifying a first additional group of multiple persons to add to the particular group of persons, wherein the first additional group of multiple persons are identified for addition to the particular group of persons based on the first additional group of multiple persons being directly related to the persons in the first group of persons and also being indirectly related to the first person;

providing, by the computer server system and to the database system in response to receiving the request, the single database query for execution by the database system, and in response, receiving results obtained by the database system from execution of the single database query, wherein the results specify the particular group of persons, wherein the database system is configured to execute the single database query in-memory;

generating, by the computer server system and based on the results obtained by the database system, the information that specifies the relationships of the first person; and providing, by the computer server system and to the client device in response to receiving the request, the information that specifies the relationships of the first person for display.

9. The computer program product of claim 8,
wherein the relational database includes:
   a first attribute for indicating a particular relationship type from among the multiple relationship types between a source person and a target person,
   a second attribute for indicating the identity of the source person, and
   a third attribute for indicating the identity of the target person,
wherein the single database query is further structured to add each person in the first group of persons to the particular group of persons as a result of identifying database entries for each person for which the first attribute indicates the single relationship type, and for which one of the second attribute and the third attribute indicates the identity of the first person.

10. The computer program product of claim 8, wherein the request further includes information that identifies a second person in the relational database, and wherein the single database query is further structured to identify only those persons in the relational database who are related to the first person through a relationship with the second person within the user-specified number of relationship separations.

11. The computer program product of claim 8, wherein the single database query is executed in an on-demand system to which a user uploads information about persons and connections, and wherein after receiving the request from the client device, the on-demand system uses the uploaded information to generate the information that specifies the relationships of the first person.

12. The computer program product of claim 8, wherein the request further includes information that specifies the single relationship type.

13. The computer program product of claim 8, wherein the client device is configured to display the information provided by the computer server system that specifies the relationships of the first person as a social graph that comprises nodes and edges that represent (i) particular persons in the particular group of persons, and (ii) relations between the particular persons, respectively.

14. A system comprising:
   one or more processors; and
   a computer program product tangibly embodied in a computer-readable storage medium and comprising instructions that when executed by a processor perform a method for analyzing and representing interpersonal relations, the method comprising:

receiving, by a computer server system and as having been sent from a client device, a request for information that specifies relationships of a first person, wherein the request includes:
   (i) information that identifies the first person, and
   (ii) information that indicates a user-specified number of relationship separations extending from the first person from which other persons are to be identified;

automatically creating, by the computer server system and in response to receiving the request, a single database query that:
   (i) when executed, causes a database system to identify a particular group of persons in a relational database that are related to the first person due to the particular group of persons being within the user-specified number of relationship separations from the first person, and
   (ii) is structured to cause the database system to identify the particular group of persons by:
      (a) identifying a first group of persons in the relational database to include in the particular group of persons, the identifying of the first group of persons including an identification of persons who are directly related, through a single relationship type from among multiple relationship types, to the first person, and
      (b) identifying additional persons in the relational database to add to the particular group of persons by performing, for each relationship separation in the user-specified number of relationship separations that extend from the identified first group of persons, a database left join operation that joins a respective additional group of persons in the relational database who are directly related, through the single relationship type, to any person in a previously joined group of persons until the number of relationship separations extending from the first person, through the single relationship type, is determined to satisfy the user-specified number of relationship separations indicated in the request,
      wherein performing a first of the database left join operations comprises identifying a first additional group of multiple persons to add to the particular group of persons, wherein the first additional group of multiple persons are identified for addition to the particular group of persons based on the first additional group of multiple persons being directly related to the persons in the first group of persons and also being indirectly related to the first person;

providing, by the computer server system and to the database system in response to receiving the request, the single database query for execution by the database system, and in response, receiving results obtained by the database system from execution of the single database query, wherein the results specify the particular group of persons, wherein the database system is configured to execute the single database query in-memory;

generating, by the computer server system and based on the results obtained by the database system, the information that specifies the relationships of the first person; and providing, by the computer server system and to the client device in response to receiving the request, the information that specifies the relationships of the first person for display.

15. The system of claim 14,
wherein the relational database includes:
- a first attribute for indicating a particular relationship type from among the multiple relationship types between a source person and a target person,
- a second attribute for indicating the identity of the source person, and
- a third attribute for indicating the identity of the target person, wherein the single database query is further structured to add each person in the first group of persons to the particular group of persons as a result of identifying database entries for each person for which the first attribute indicates the single relationship type, and for which one of the second attribute and the third attribute indicates the identity of the first person.

16. The system of claim 14, wherein the request further includes information that identifies a second person in the relational database, and wherein the single database query is further structured to identify only those persons in the relational database who are related to the first person through a relationship with the second person within the user-specified number of relationship separations.

17. The system of claim 14, wherein the single database query is executed in an on-demand system to which a user uploads information about persons and connections, and wherein after receiving the request from the client device, the on-demand system uses the uploaded information to generate the information that specifies the relationships of the first person.

18. The system of claim 14, wherein the client device is configured to display the information provided by the computer server system that specifies the relationships of the first person as a social graph that comprises nodes and edges that represent (i) particular persons in the particular group of persons, and (ii) relations between the particular persons, respectively.

* * * * *